United States Patent
Vitenson (10) Patent No.: US 9,289,088 B2
(45) Date of Patent: Mar. 22, 2016

(54) PEELER AND SLICER

(71) Applicant: Mikhael Vitenson, Norwalk, CT (US)

(72) Inventor: Mikhael Vitenson, Norwalk, CT (US)

( * ) Notice: Subject to any disclaimer, the term of this patent is extended or adjusted under 35 U.S.C. 154(b) by 85 days.

(21) Appl. No.: 14/026,474

(22) Filed: Sep. 13, 2013

(65) Prior Publication Data

US 2015/0075007 A1 Mar. 19, 2015

(51) Int. Cl.
*B26D 3/08* (2006.01)
*A47J 17/02* (2006.01)
*B26D 3/28* (2006.01)
B26B 3/04 (2006.01)
A47J 17/04 (2006.01)

(52) U.S. Cl.
CPC . *A47J 17/02* (2013.01); *B26D 3/08* (2013.01); *B26D 3/283* (2013.01); *A47J 17/04* (2013.01); *B26B 3/04* (2013.01)

(58) Field of Classification Search
CPC ............ A47J 17/02; A47J 17/04; B26B 3/04; B26D 3/08; B26D 3/283
USPC ........ 30/279.6, 278, 142, 279.2; 99/539, 540, 99/584
See application file for complete search history.

(56) References Cited

U.S. PATENT DOCUMENTS

| | | | |
|---|---|---|---|
| 1,990,127 A * | 2/1935 | Lambert et al. | 30/280 |
| 2,427,095 A * | 9/1947 | Gordon et al. | 425/187 |
| 2,556,528 A * | 6/1951 | Elkington | 30/279.6 |
| 3,956,825 A * | 5/1976 | Ness | A47J 17/02 30/279.6 |
| 6,591,503 B1 * | 7/2003 | Voves | A47G 21/02 30/142 |
| D486,703 S * | 2/2004 | Settele | D7/695 |
| D582,222 S * | 12/2008 | Lolsberg | D7/681 |
| 2004/0117991 A1* | 6/2004 | Haberstroh | 30/279.6 |
| 2010/0107421 A1* | 5/2010 | Cedar et al. | 30/232 |
| 2010/0162906 A1* | 7/2010 | Scimone | 99/541 |

* cited by examiner

*Primary Examiner* — Ned Landrum
*Assistant Examiner* — Liang Dong
(74) *Attorney, Agent, or Firm* — Mintz Levin Cohn Ferris Glovsky and Popeo, P.C.

(57) ABSTRACT

An apparatus for cutting, peeling, and/or slicing is provided. The apparatus includes a frame, a handle, a blade, and one or more scoring elements near the blade. The scoring elements are provided to score the item before being cut/peeled/sliced by the blade. The apparatus can be provided with one or more adjusters for adjusting the blade and/or one or more of the scoring elements. A corresponding method for cutting, peeling, and/or slicing is also provided.

18 Claims, 12 Drawing Sheets

PEELER AND SLICER

TECHNICAL FIELD

The subject matter described herein relates to peelers and slicers, particularly to vegetable and fruit peelers, and cheese and deli meat slicers.

BACKGROUND

There are many existing peelers in the market that work well for peeling hard vegetables and fruits such as potatoes, carrots and cucumbers. However, those peelers generally do not work well for soft fruits or vegetables such as mangoes, kiwis, and tomatoes.

In addition, although there are existing cheese slicers on the market, they do not cut straight and even slices, and there are currently no handheld cold-cut slicers that slice deli meats in an even manner. There are also currently no handheld slicers for larger fruits, such as pineapples.

SUMMARY

In one aspect, the present subject matter provides an apparatus including a handle; a frame connected to the handle; a blade supported by the frame; and a first scoring element supported by the frame near the blade, the scoring element having a scoring edge protruding above the blade to cut into an item before being cut by the blade.

In some embodiments of the present subject matter, the apparatus can further include a second scoring element supported by the frame. The one or more of the scoring elements can be supported for movement along at least a portion of the blade. In some embodiments, the first scoring element can be arranged near one side of the blade, and the second scoring element can be arranged near an opposite side of the blade.

In some embodiments of the present subject matter, the first scoring element can be supported for movement along at least a portion of the blade. In some embodiments, the first scoring element can be supported between the blade and the handle. In some embodiments, the blade can be supported between the first scoring element and the handle.

In some embodiments of the present subject matter, the blade can include a first portion defining a cutting surface, and a second portion adjacent the first portion defining a gap therebetween.

In some embodiments of the present subject matter, the apparatus can also include a roller supported by the frame. The roller can be arranged between the blade and the handle, at a distance from the blade to define an opening therebetween.

In some embodiments of the present subject matter, the apparatus can also include a scoring element adjustor for moving at least one of the scoring elements to adjust a distance between the scoring elements. The scoring element adjustor can include a lever actuatable by a user to move the at least one of the scoring elements. In some embodiments, the scoring element adjustor can also include a shaft for translating a movement of the lever into a movement of the at least one of the scoring elements. In some embodiments, a spring for returning the scoring elements to an initial position can be provided. A lock for locking the scoring elements in a locked position and/or a release button for releasing the lock and allow adjustment of the scoring elements can also be provided.

In some embodiments of the present subject matter, the scoring element can be a rotatable cutting wheel or a protrusion.

In some embodiments, the scoring element adjustor includes first and second actuatable portions, wherein the lever is a first actuatable portion, and the handle forming a second actuatable portion.

In some embodiments of the present subject matter, the roller is supported for movement toward and/or away from the blade.

In some embodiments, a roller adjustor is provided for adjusting the movement of the roller toward and away from the blade.

The present subject matter also provides a method for peeling and/or slicing an item. The method includes providing an apparatus including one or more features provided herein, scoring the item using the first scoring element of the apparatus, and peeling and/or slicing the item using the blade of the apparatus. In some embodiments, the item is first scored by the one or more of the scoring elements in a first direction, and then peeled by the blade in a second direction perpendicular to the first direction.

In some embodiments of the present subject matter, the method can include scoring the item at a distance apart using a plurality of scoring elements, and peeling and/or slicing the item therebetween.

In some embodiments, the method can also include adjusting one or more of: an angle of the blade, a distance between a plurality of scoring elements, a distance between the blade and a roller, a protruding height of one or more scoring elements, a size of the scoring element, a size of the blade, an opening of the blade, a size of the roller, and a cutting angle of the blade.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference numerals in the various drawings indicate like elements.

DETAILED DESCRIPTION

Figure 1A:
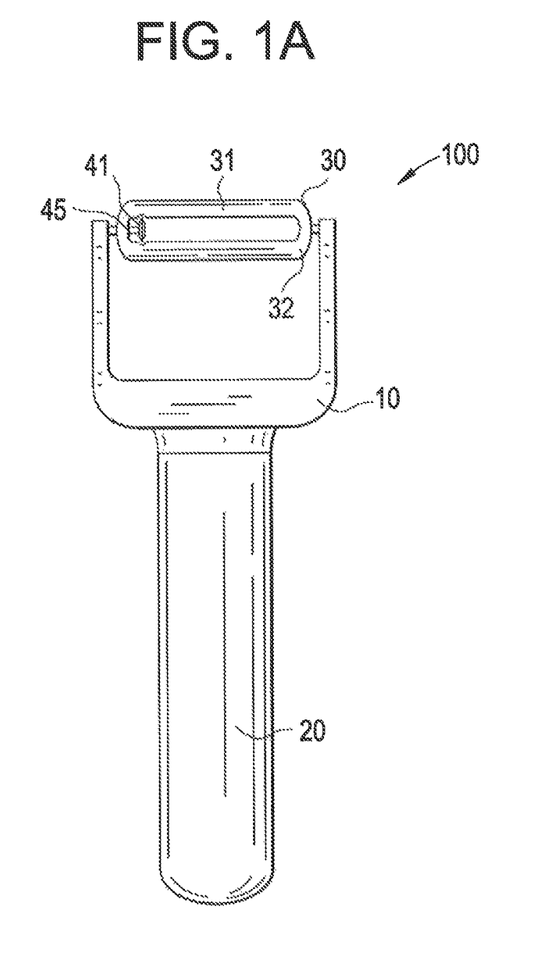
FIG. 1A is a front elevational view of an implementation of an apparatus in accordance with the present subject matter.

FIG. 1A shows an implementation of an apparatus 100 in accordance with the present subject matter. Apparatus 100 includes a U-shaped frame 10 having a base connected to a handle 20. A blade (e.g. for peeling and/or slicing) 30 is attached to the open end of the U-shaped frame 10 for peeling a produce (such as vegetables and fruits). Blade 30 has a first cutting side 31 and a second side 32 (which can also be a cutting side and/or a stabilizing side). Blade 30 can be similar to the blades of existing peelers, in some embodiments, blade 30 may be rotatably supported (e.g., the rotation can be limited to a specific range) or fixedly supported on the frame 10. In this implementation, the blade and the handle are arranged perpendicularly to one another. In some embodiments, the peeling blade and the handle may be arranged at an angle between 0 to 90 degrees to provide ease of use.

Notably, peeler 10 also includes a scoring element 41 in the form of a cutting wheel rotatably supported on an axle 45 at one side of the blade 30, between the first and second sides of the blade 30. Scoring element 41 is constructed and arranged to score the skin of the produce to be peeled before the blade 30 peels the skin. By scoring the skin, a section of the skin is at least partially separated to allow the blade 30 to make better contact with the skin (e.g. more fully in contact with the blade), and thus better peel the skin. This is particularly useful for peeling vegetables and fruits that are soft, such as, e.g., kiwi, mango, tomato, and the like.

In the implementation shown in FIG. 1, the first and second sides 31 and 32 of the blade 30 have openings or notches to accommodate the scoring element 41, and the scoring element 41 slightly overlaps portions of the blade 30.

Figure 1B:
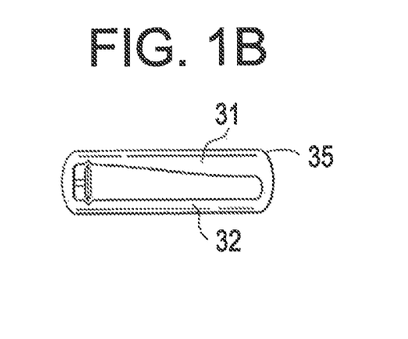
FIG. 1B is a top view of a blade in accordance with the present subject matter.

FIG. 1B shows an implementation of the peeling blade in accordance with the present subject matter. Blade 35 is similar to blade 30 of FIG. 1A, except that the cutting side 31 is angled toward cutting side 32 (instead of being substantially perpendicular as in FIG. 1).

Figure 2:
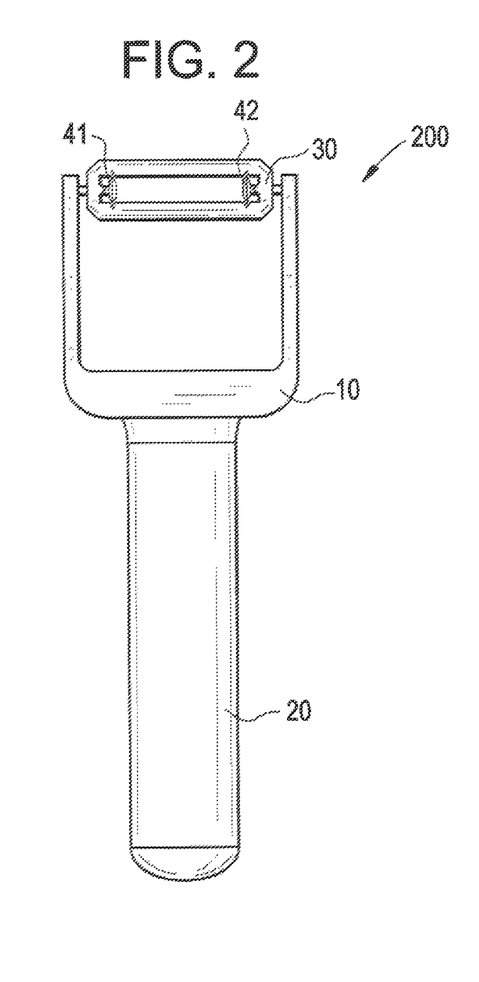
FIGS. 2 and 3 are front and side elevational views of another implementation in accordance with the present subject matter.
Figure 3:
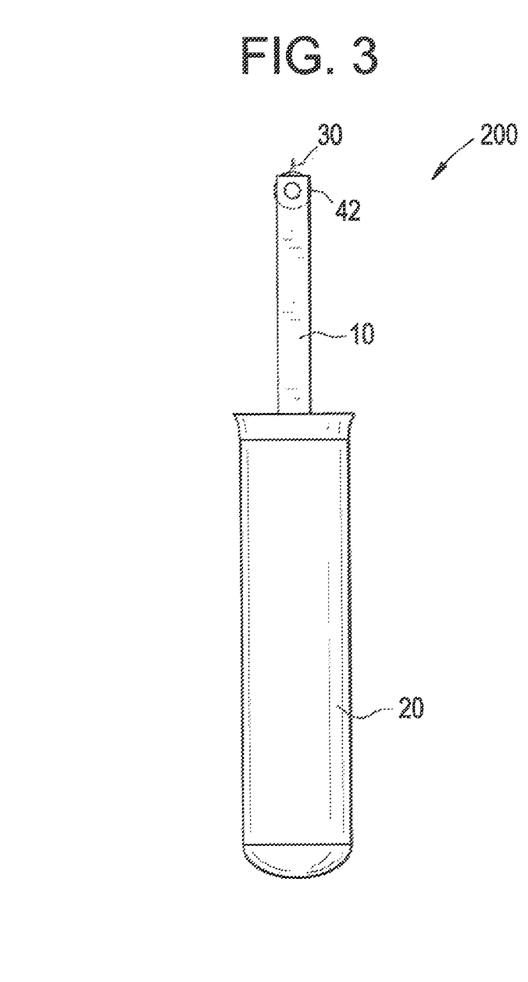

References will now be made to FIGS. 2 and 3, which show another implementation of the present subject matter. Apparatus 200 is similar to apparatus 100 shown in FIG. 1, except that two scoring elements are provided. Specifically, a first scoring element 41 is provided at one side of the blade 30 (and the U-shaped frame 10), and a second scoring element 42 is provided at an opposite side of the blade 30 (and the U-shaped frame 10).

In some embodiments, one, two, or more scoring elements may be provided. For example, a third scoring element may be provided between the first and second scoring elements shown in FIGS. 2 and 3. In some embodiments, one or more of the scoring element(s) may be arranged in front of or behind the blade 30, and/or outside the blade 30.

Figures 4, 5A, 5B:
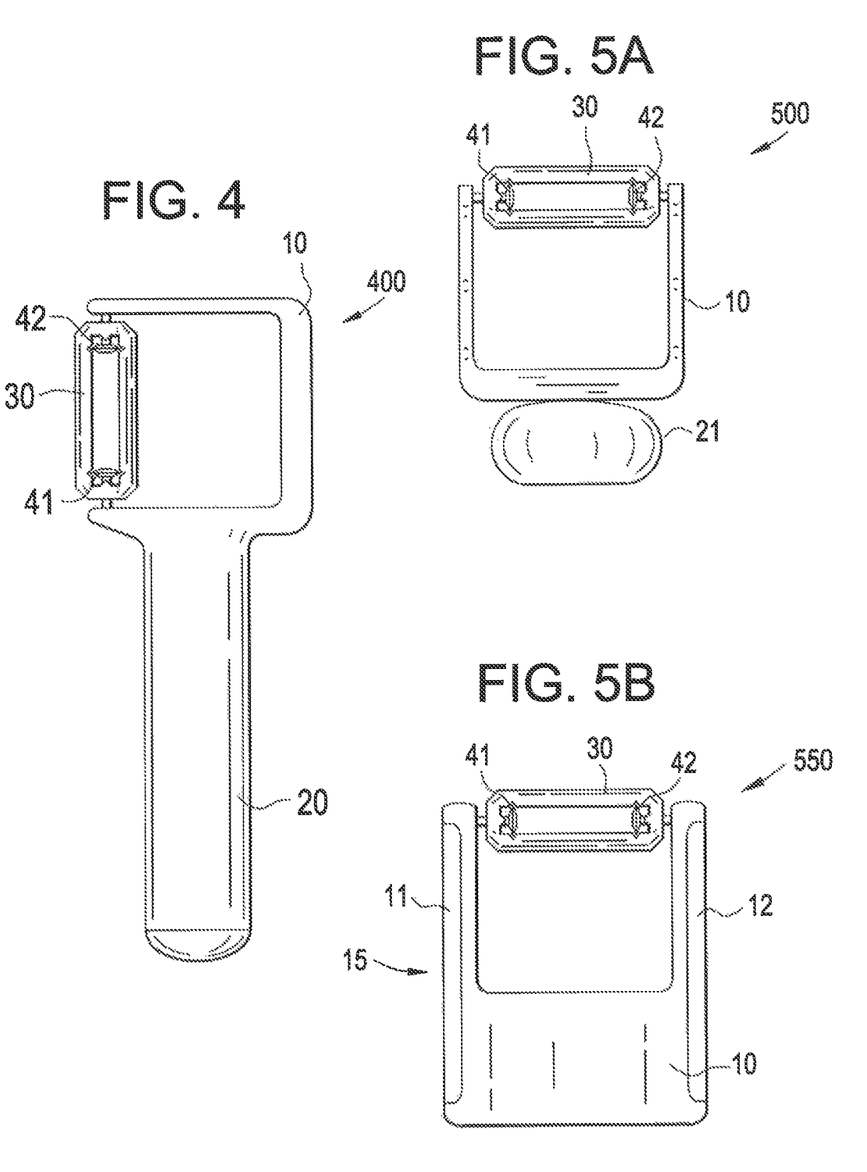
FIGS. 4, 5A, and 5B are front elevational views of additional implementations in accordance with the present subject matter.

FIG. 4 shows yet another implementation of the present subject matter. Apparatus 400 is similar to apparatus 200 of FIGS. 2 and 3, except that the handle is arranged to extend along an axis parallel (or substantially parallel) to the blade 30. As noted above, the handle can be configured to be at different angles with respect to the blade in other embodiments to provide, e.g., comfort or ease of use for the user.

FIG. 5A shows apparatus 500, which is similar to apparatus 400 except that the handle is provided in the form of a knob 21 to allow the user to hold apparatus 500, e.g., in the palm of the user's hand. This configuration reduces the overall size of the apparatus, and could provide better ease of use or comfort in certain situations (e.g. to peel or cut certain produce). FIG. 5B shows apparatus 550 in which the frame 10 includes a handle portion 15 configured to allow the user to hold apparatus 550. The frame and/or the handle portion can have any suitable shapes and sizes to allow the user to hold the apparatus in hand. Apparatus 550 also includes optional grip portions 11 and 12. In some embodiments, the grip portions can be made of a rubber material to provide, e.g., a non-slip and/or soft surface for user comfort.

In some embodiments, one or more of the scoring element(s) can be cutting wheel(s) as shown in FIGS. 1-5. In some embodiments, the scoring element(s) can be one or more protrusions. In some embodiments, the scoring element(s) may include any combination of cutting wheel(s) and/or protrusion(s). The one or more protrusions may be constructed and arranged to score the skin for the peeling blade, and may include, for example, one or more cutting edges.

The apparatus may have any suitable dimensions depending on the size/shape of the produce to be peeled. For example, the apparatus may have an overall length between 4.5" to 6" (preferably between 4.75" to 5.75"), and a width of between 1" to 5" (preferably between 1.25" to 2.5"). The cutting element(s) may also have any suitable dimensions depending on the size/shape of the produce to be peeled. For example, the cutting element(s) may have a diameter (or height) between 3 mm-5 min. The distance between the cutting elements may also be chosen based on the produce to be peeled. For example, when peeling a relatively small produce such as kiwi or tomato, the distance between the cutting elements may be closer, while a further distance can be used for a larger produce such as mango or cantaloupe.

Figure 6A:
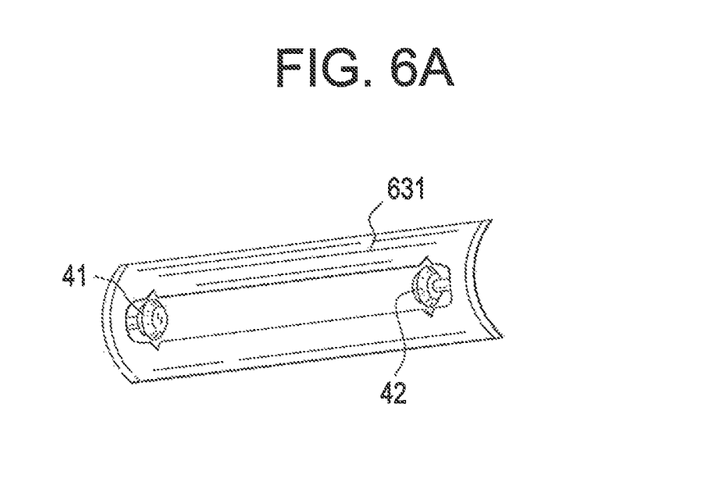
FIGS. 6A and 6B are perspective views of further implementations of the present subject matter.
Figure 6B:
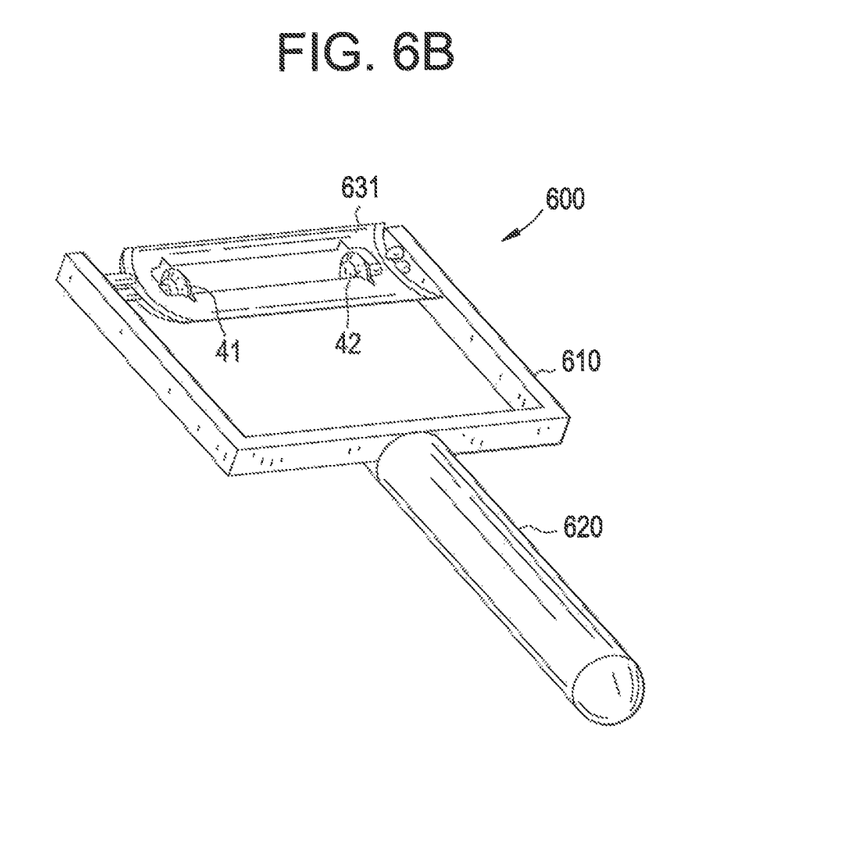

FIG. 6A shows another implementation of the peeling blade in accordance with the present subject matter. Specifically, peeling blade 631 is curved to enhance peeling for certain types of produce. FIG. 6B shows an implementation of the peeler in accordance with the present subject matter which implements the curved peeling blade 631 shown in FIG. 6A. Apparatus 600 includes the curved peeling blade 631, which mimics the contours of the produce to be peeled, for example, to enhance and/or assist the peeling of the produce. Apparatus 600 also includes first and second scoring elements 41 and 42, which are supported by a frame 610 attached to a handle 620. In some embodiments, the peeling blade can be shaped to follow the contour of the produce, and can be curved along one or more axes of the blade. For example, the blade shown in FIGS. 6A and 6B are curved along the length of the blade. In some embodiments, the blade can be curved, for example, along the width of the blade, and/or along other axes.

Figure 7:
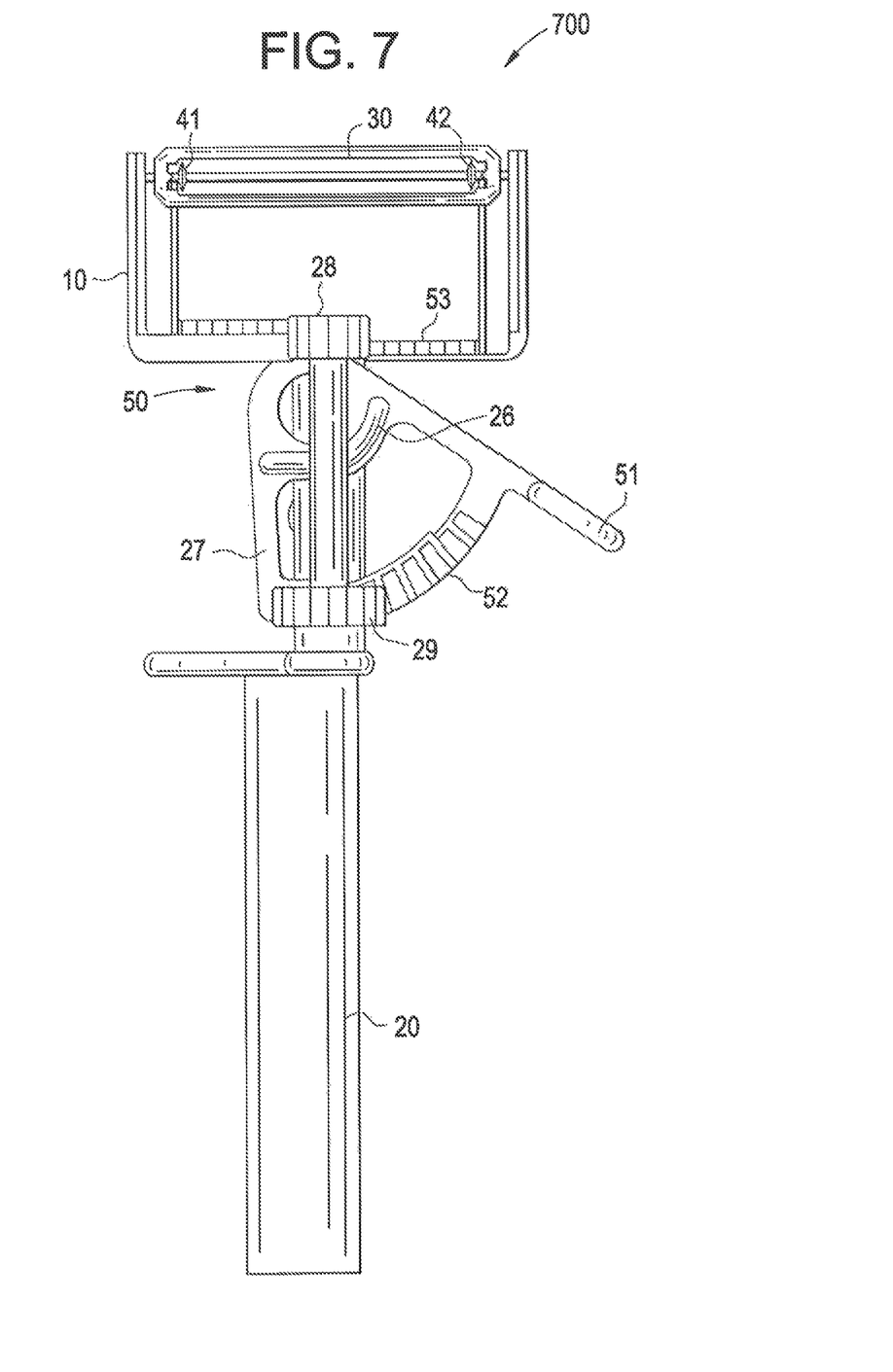
FIG. 7 is a front elevational view of a further implementation in accordance with the present subject matter.

FIG. 7 shows apparatus 700, which is another implementation in accordance with the present subject matter. This implementation is similar to the one shown in FIGS. 2 and 3, but it is additionally provided with a scoring element adjustor 50 (e.g., means or mechanism) for adjusting a distance between the scoring elements. By allow the distance between the scoring elements to be adjusted, the apparatus can be used on a wider range of produce to be peeled, and the peeling process can be enhanced/improved. For example, a relatively small fruit like a kiwi would require a relatively small distance between the scoring elements while a larger fruit like a mango may require a larger distance between the scoring elements to expedite the peeling process (e.g., by producing a larger section of the peel).

Scoring element adjustor 50 includes a rotatable shaft 27 having a first gear 28 at one end, and a second gear 29 at an opposite end. Scoring element adjustor 50 also includes a lever 51, which is pivotably secured to a support. Lever 51 is associated with a curved gear track 52, which when moved (i.e. as the lever 51 is pivoted by the user), moves the second gear 29 and rotates the shaft 27, and in turn moves the first gear 28. This in turn moves straps 53 and 54 (e.g. rubber straps or the like) extending substantially parallel to the peeling blade 30, to which the first and second scoring elements 41 and 42 are connected, thereby wrapping/unwrapping the traps around the first gear and thus moving the scoring elements 41 and 42 closer or further away from each other. In essence, the shaft 27 translates the movement of the lever into a corresponding movement of the scoring element(s).

In some embodiments, a return spring can be provided (e.g., supported by the support structure) and configured to bias the scoring element adjustor in a normal position (e.g., where the scoring elements are widest apart).

In some embodiments, one of the scoring elements is fixedly secured (e.g. relative to the frame) while the other scoring element is movable. In some embodiments, a lock (or locking mechanism) can be provided to hold the scoring element(s) and/or the adjustor in a desired position.

Figure 8:
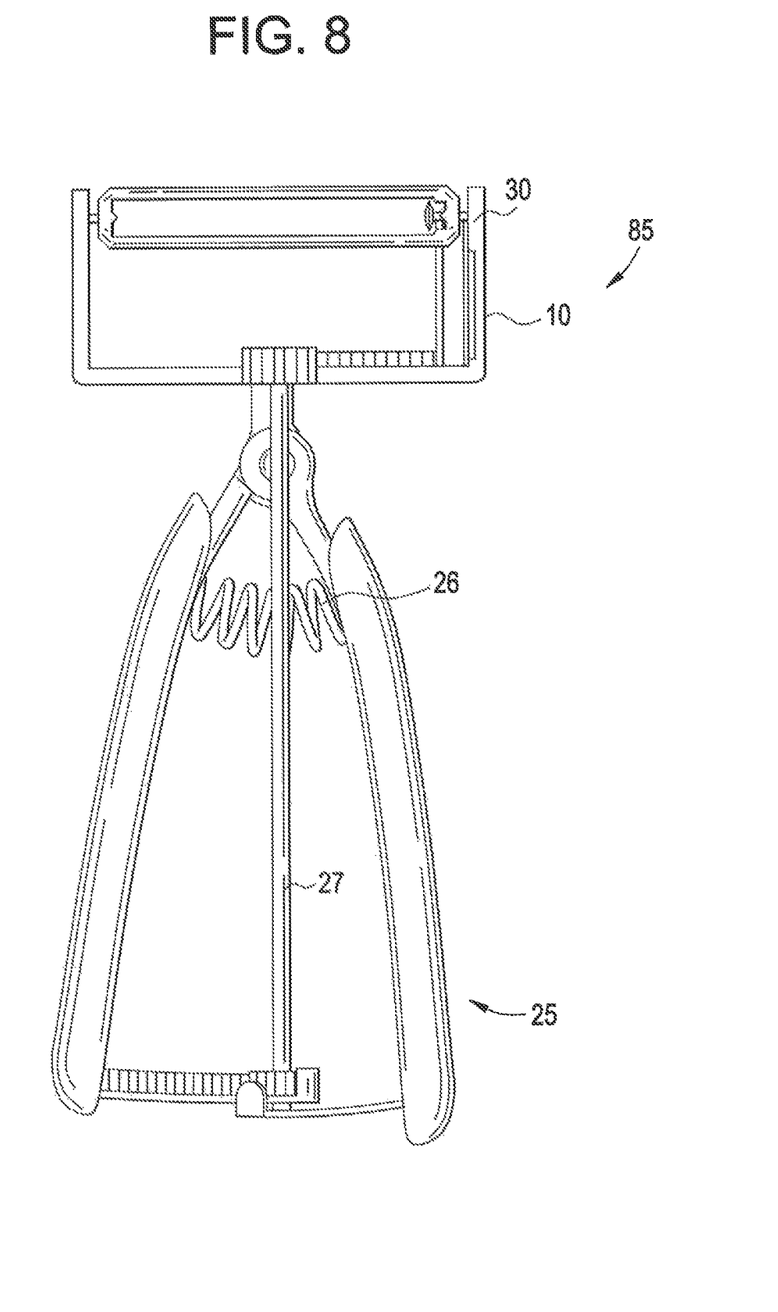
FIG. 8 is a front elevational view of another implementation of the present subject matter.

FIG. 8 shows yet another implementation of the apparatus in accordance with the present subject matter. Apparatus 800 provides a different scoring element adjustor than the one shown in FIG. 7. Specifically, instead of a handle with a pivotable lever, scoring element adjustor 85 includes two handle portions in which a first handle portion is stationary (like the handle 10 of FIG. 7) while a second handle portion is movable toward the first handle portion (like the lever 51 of FIG. 7). The actuating action is similar to a pair of scissors, and when actuated, rotates the shaft 27, and in turn, moves at least one of the scoring elements toward the other. In other words, the shaft 27 translates the movement of the handle portion(s) to a corresponding movement of the scoring element(s). A return spring 26 is provided to bias the scoring element adjustor in a normal position (e.g., where the scoring elements are widest apart).

In some variations, one of the scoring elements can be fixedly secured (e.g. relative to the frame) while the other scoring element can be movable. In some embodiments, a lock (or locking mechanism) can be provided to hold the scoring element(s) and/or the adjustor in a desired position.

Figure 9A:
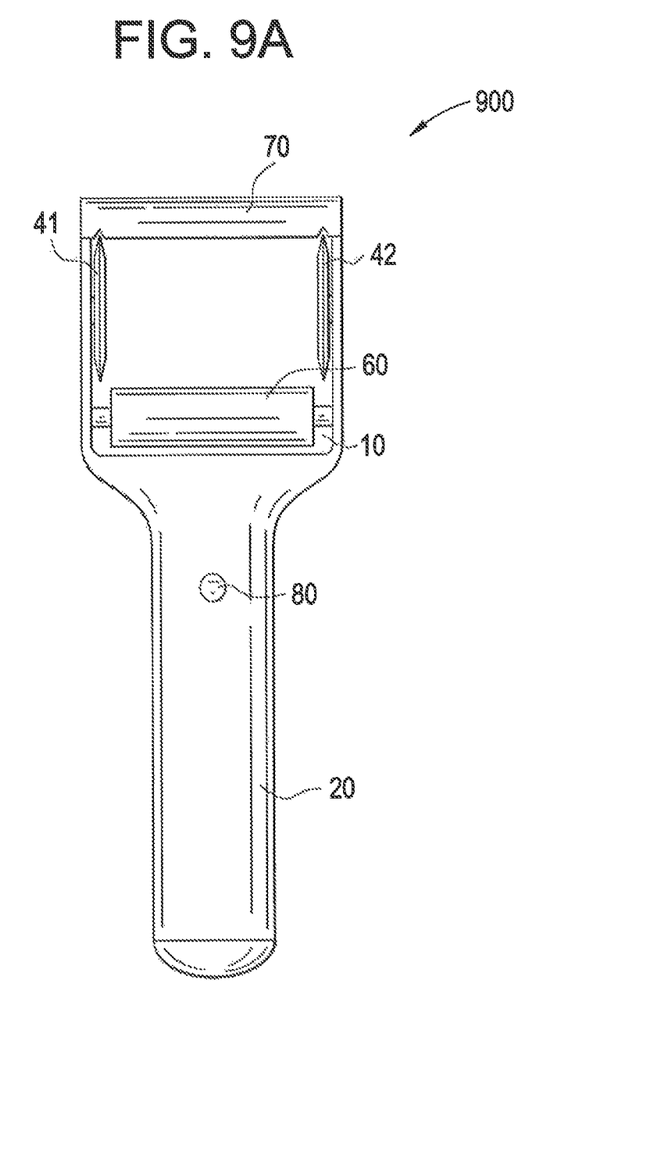
FIGS. 9A and 9B are front views of yet further implementations in accordance with the present subject matter.
Figure 9B:
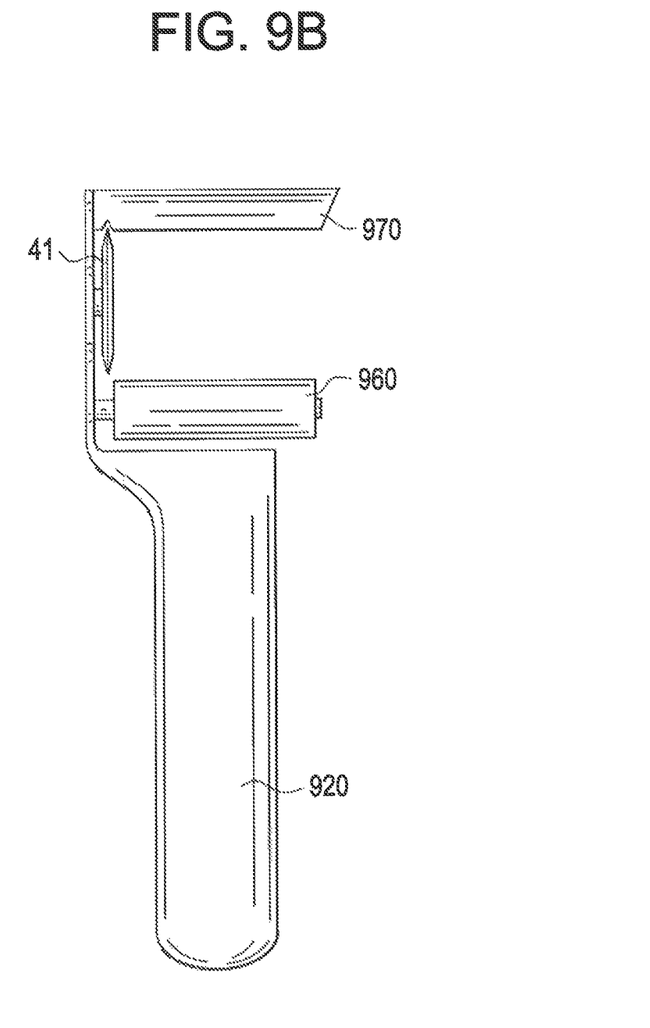

FIGS. 9A and 9B show further implementations in accordance with the present subject matter. Apparatus 900 is configured and arranged for peeling and/or slicing, for example, a pineapple or cheese. Apparatus 900 includes a frame 10 and a handle 20 connected (or integral) to the frame 10. Apparatus 900 also includes a blade 70 and a roller 60 (e.g. a stabilizing roller) pivotably secured to the frame 10. The blade 70 has a cutting edge facing the roller, and can be fixedly secured or pivotably secured to the frame 10. First and second scoring elements 41 and 42 are secured to the frame 10 between the slicing blade 70 and the roller 60.

FIG. 9B shows an apparatus that is similar to the one of FIG. 9A except that the blade 970 and the roller 960 are supported on a single side, and a single scoring element 41 is provided. This provides a larger opening and may provide better/easier slicing in certain situations.

Figure 10:
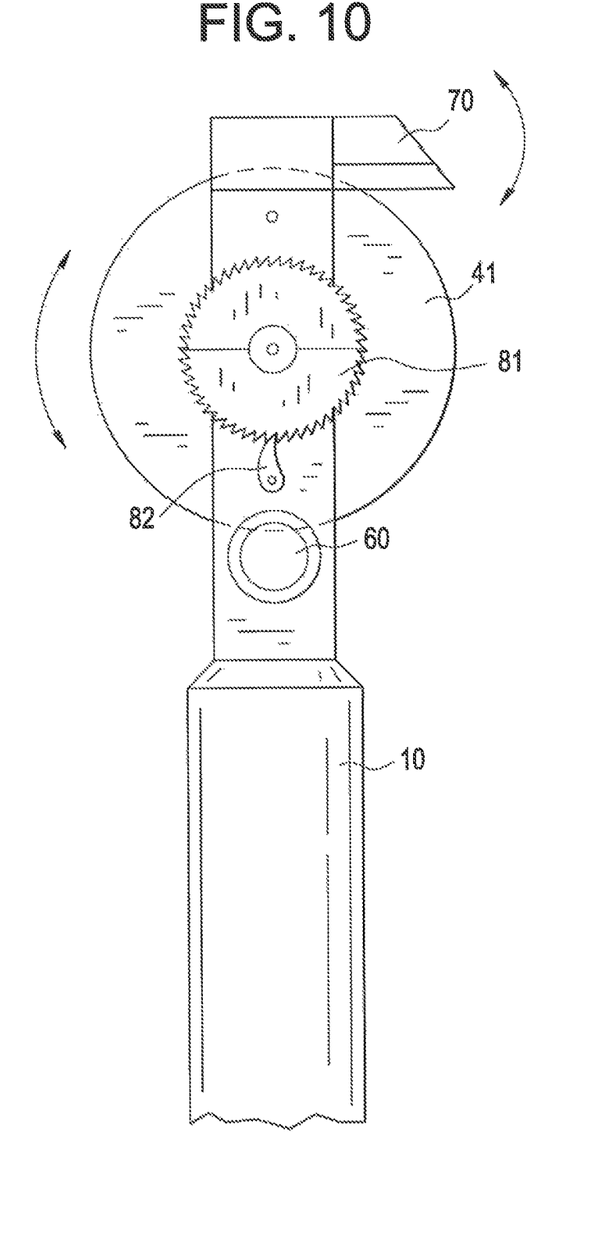
FIG. 10 is a side elevational view of another implementation of the present subject matter.

In use, apparatus 900 can peel and/or slice the food by moving the apparatus along a side of the food. The spacing between the roller 60 and the blade 70, and/or the angle of the blade 70 can be configured to achieve a desired cutting thickness. In some embodiments, the spacing and the angle can be fixed for a particular application (e.g. as shown in the embodiment of FIG. 9A). In some embodiments, the blade 70 can be pivotably supported on the frame 10, and the angle can be adjusted until a lock (or locking mechanism) locks the blade in a desired position. The lock may be actuated by a release button 80. As shown in FIG. 10, blade 70 can be pivotably supported on the frame. Apparatus 900 can be provided with a ratcheting feature (e.g., means or mechanism), including a ratchet gear 81 and a pawl 82 for maintaining blade 70 at an angle. The ratcheting feature can be configured to allow blade 70 to be ratcheted/rotated in one direction (e.g., clockwise) at discrete angles (e.g., as set by one or more features of ratchet gear 81 such as the size, number of teeth, spacing between teeth, etc., and pawl 82). Release button 80 can be configured to separate pawl 82 from ratchet gear 81, thereby to release blade 70 to allow it to be returned to an initial position. In some embodiments, a return spring can be provided to automatically return blade 70 to the initial position (e.g., extending along frame 10 or at a different position).

In some embodiments, blade 70 may be straight, curved and/or angled. The scoring elements 41 and 42 may be rotatable wheels, or sharp protrusions as discussed above with regard to other implementations. In some embodiments, one or more rollers can be provided. The rollers being constructed and arranged to suit the particular use/application. In some embodiments, the roller(s) can be made of a round material surrounded by a hollow pipe, such that the hollow pipe circles around the round pole. In some embodiments, the scoring elements can be adjustably mounted to the frame such that they can be protracted or retracted from the sides of the frame (e.g., to adjust a protrusion height). For example, the scoring elements may be configured to be secured at one of a plurality of positions using pins that hold them in place, and the pins can be configured to release the scoring elements via, e.g., a release mechanism such as a button. In some embodiments, the scoring elements can be held in place in a new position, e.g., by retractable pins and a spring installed in the frame can be configured to return the scoring elements back into an initial position using a release button.

Figure 11:
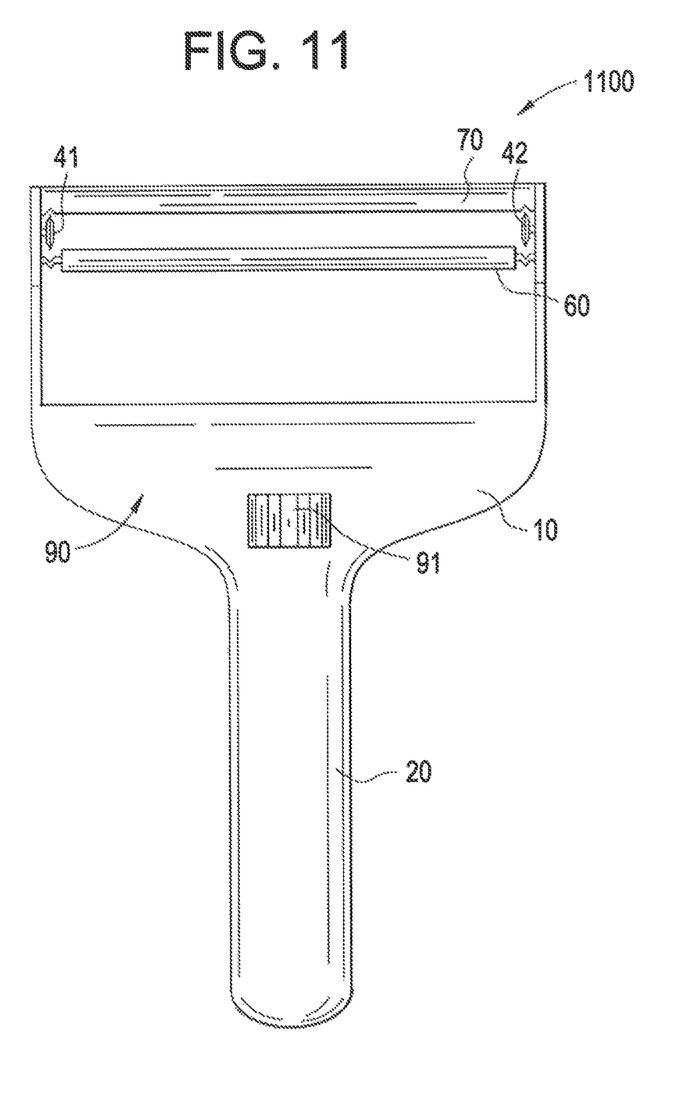
FIG. 11 is a front elevational view of a further implementation of the present subject matter.
Figure 12:
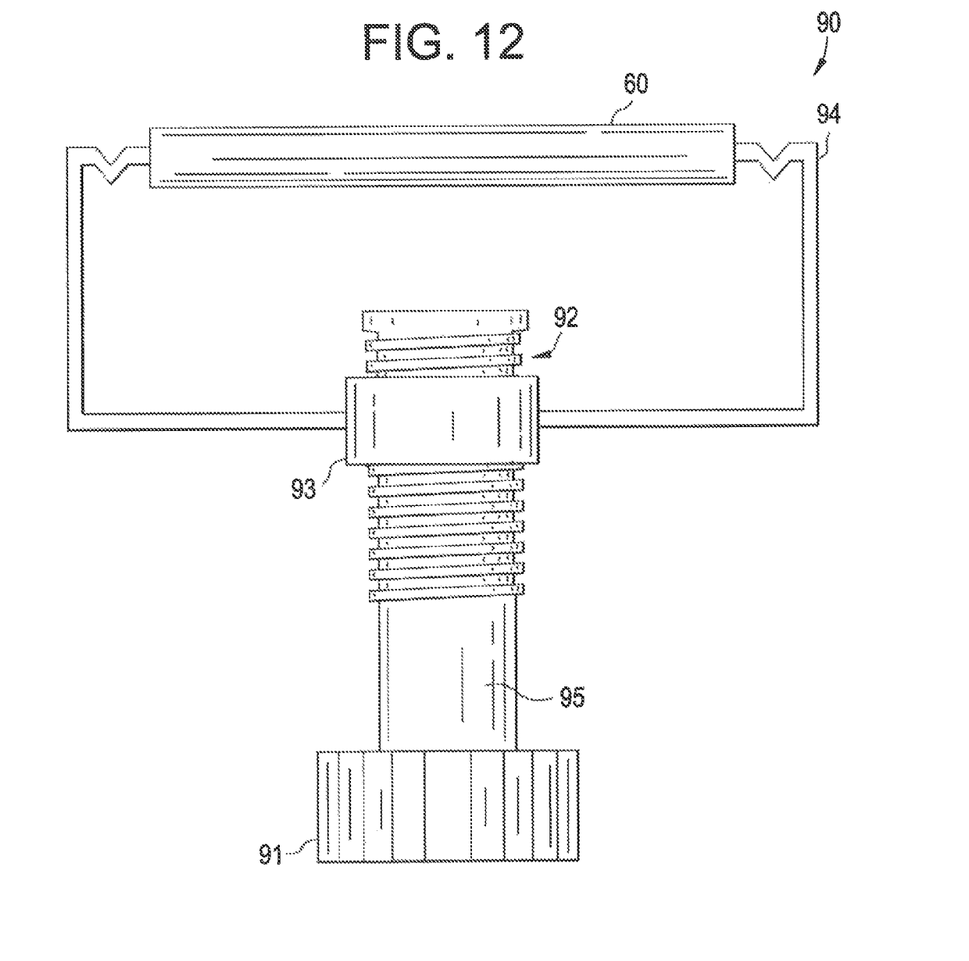
FIG. 12 is an elevational view of an implementation of a roller adjuster in accordance with the present subject matter.
Figure 13:
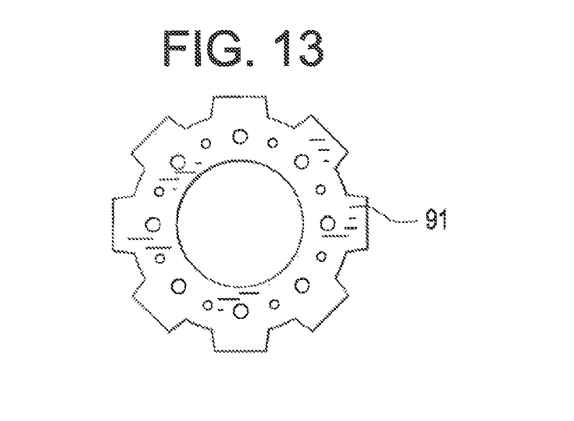
FIG. 13 is a top plan view of a thumb wheel shown in FIG. 12.

FIG. 11 shows yet a further implementation of an apparatus 1100 in accordance with the present subject matter. This implementation is substantially similar to the implementation of FIG. 9A, and may be particularly useful as a slicer (e.g., for slicing cheese, ham, or other cold cuts). As can be seen, apparatus 1100 includes a relatively wide roller 60 (e.g., stabilizer or stabilizing roller) and blade 70 combination, and a set of relatively small scoring elements 41 and 42. The frame 10 is provided with a roller adjustor 90 (e.g., means or mechanism) for adjusting the position of the roller 60. The roller adjustor includes a thumb wheel 91, which can be actuated to move the roller 60 closer or further from the blade 70. For example, FIGS. 12 and 13 show an implementation of the roller adjustor 90, which includes a movable frame 94 supporting roller 60. Roller adjustor 90 also includes a rotatable shaft 95 having a thumb wheel 91 at one end, and a threaded portion 92. The threaded portion 92 is configured and arranged to engage a nut portion 93 of the movable frame 94 to translate a rotational movement of the shaft 95 into a linear movement of the frame 94 to move the roller 60. In some embodiments, the movable frame can be configured to support a blade instead of the roller to provide adjustability of the blade. In some embodiments, the adjustor can be configured and arranged to simultaneously move the blade and the roller towards and away from each other. For example, two separate movable frames (one supporting the blade and one supporting the roller) can be provided to engage the threaded portion of the rotatable shaft.

In use, scoring elements 41 and 42 operate to score the food (e.g., cheese or cold cut) while blade 70 slices it. Blade 70 can be similar to the one shown in FIG. 9A, and can be permanently mounted to the handle 20 or mounted to the sides of the frame 10. Roller 60 can be arranged (e.g., by adjusting its position) in some embodiments to produce a thicker or thinner slice. In some embodiments, the adjustment can be done, e.g., by transferring a rotational motion via one or more gears to a linear motion or by manually adjusting the location of the roller 60 by using, e.g., pins to lock it in place. When the roller is adjustable, the scoring elements can be secured or movable relative to the roller to move with the roller during adjustment, e.g., to cover the distance between the blade and the roller. In some embodiments, the roller, the scoring elements, and/or the blade can be adjusted individually or together to control and produce a desired thickness.

In some embodiments, the apparatus (e.g., for cutting, peeling, and/or slicing) can have a blade that has a plurality of teeth (like a julienne blade) or other shapes to produce peels/slices like a julienne or other shapes such as zigzag, oval, or heart shapes and the like.

In some embodiments, the apparatus is configured to slice fruits off their pit or core. The apparatus can be configured similar to, e.g., the implementation shown in FIG. 9A, except that the distance between the blade and the stabilizer can be configured by the user by adjusting the blade, roller, and/or scoring element(s) to produce the size of the contemplated peel/slice.

Figure 14:
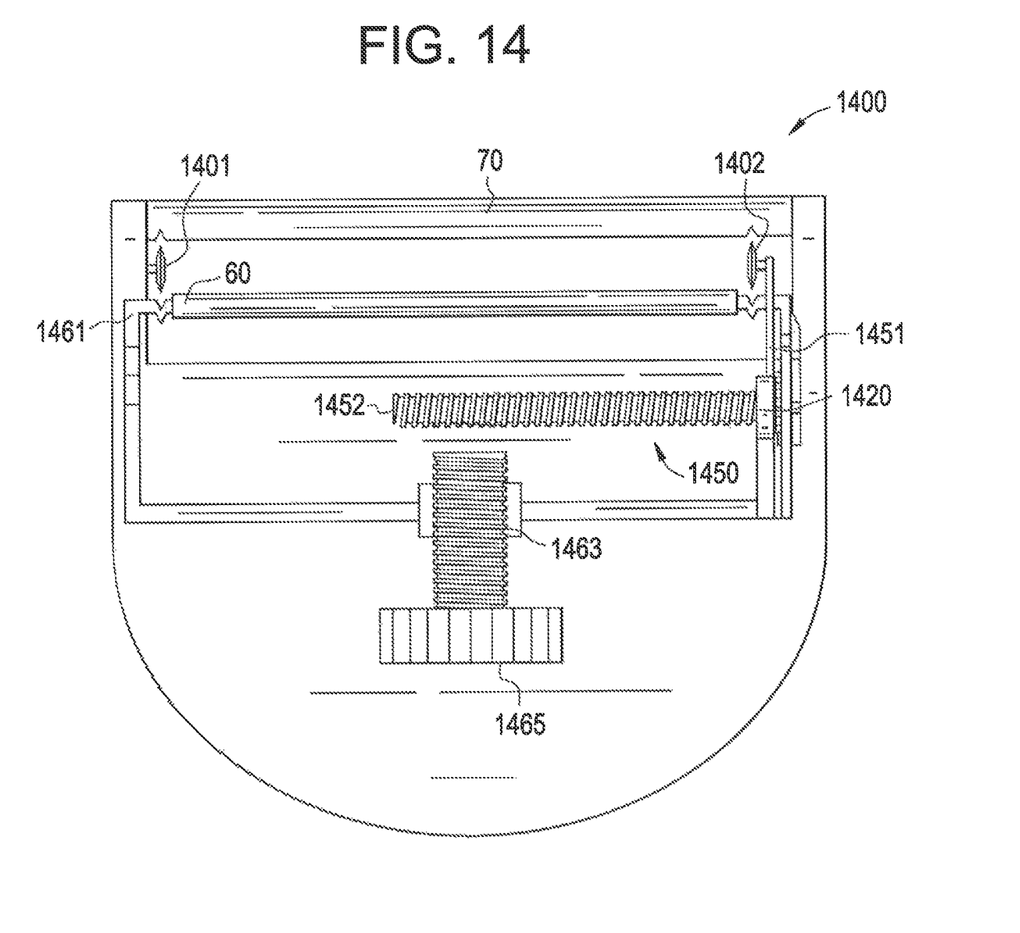
FIG. 14 is an elevational view of an implementation of a scoring element adjuster and roller adjuster in accordance with the present subject matter.

FIG. 14 shows yet another implementation of an apparatus 1400 in accordance with the present subject matter. Apparatus 1400 includes a frame 1410 for supporting a roller 60, a blade 70, and a stationary scoring element 1401. Apparatus 1400 also includes a movable scoring element 1402 which is movable via an adjuster 1450. Adjuster 1450 includes a movable frame 1451 supporting the movable scoring element 1402. Movable frame 1451 being configured to be moved along a threaded shaft 1452. Threaded shaft 1452 can be rotated by a thumb wheel 1420 at one end to be rotated by the user to move the movable scoring element.

Apparatus 1400 also includes a movable frame 1461 supporting the movable roller 60. The movable frame 1461 is operatively connected to a threaded shaft 1463, which can be rotated by a thumbwheel 1465 at one end. In use, the user can rotate the thumbwheel 1465, thereby moving the movable roller 60 to adjust the opening between the roller and the blade 70. In some embodiments, apparatus 1400 can be incorporated in a housing with a handle similar to the embodiment shown in FIG. 11.

In some embodiments, the blade can be configured to be adjustable instead of the roller, or the blade and the roller can both be provided on separate adjustable supports for separate adjustability. In some embodiments, a peeling blade, such as, for example the ones shown in FIGS. 1-8 can be provided instead of a slicing blade for use with an adjustable roller.

It will be appreciated by one skilled in the art that the apparatus can be implemented in different sizes depending on the desired use/application. For example, the distance between the scoring elements can be adjusted (determined) based on the type of food (e.g., fruits, vegetables, cheese, etc.) to be used. If the scoring elements are relatively closer to each other, the apparatus could be suitable for smaller food like a kiwi or a tomato, while a larger distance could be suitable for larger food like a cantaloupe or pineapple. The blade (e.g., for cutting, peeling, and/or slicing) can have a straight cutting edge, or have a curvature and/or angle, e.g., to follow the contours of the food.

In some embodiments, the distance between the scoring elements can be controlled by the user. For example, the scoring elements can be attached on a separate frame, which can be constructed such that the user may, e.g., push two ends of the handle together or by pushing a lever (similar to an ice cream scoop). The actuating movement can be transferred (or translated) via one or more rotating gears, e.g., to a horizontal movement to bring the scoring elements closer or further away from one another. A spring can be provided to return the scoring elements to an initial position.

In some embodiments, the scoring elements may both be fixedly secured to the frame, or one or more of them can be configured to move toward the other, or one another. A lock or locking mechanism can be provided to lock the movable scoring element(s) in place. For example, a locking pin can be inserted into the gears to lock them in place when the scoring elements are at a desired position. The locking position can be user-selected. The lock can be configured such that upon release, the apparatus will return to its initial position.

In some embodiments, the scoring element(s) can be small, for example, for foods (e.g., fruits and vegetables) that have a thin skin. Larger scoring element(s) can be provided for foods that have a thicker skin.

While a handheld apparatus is discussed herein, in some implementations, one or more features discussed above can also be implemented in, for example, a machine for peeling and/or slicing. For example, one or more of the blade(s), roller(s), and scoring element(s) can be implemented in a peeling/slicing machine in which the produce to be peeled and/or sliced is fed via a conveyor belt.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. Other implementations may be within the scope of the following claims.

The invention claimed is:

1. An apparatus comprising:
a frame;
a blade supported by the frame, the blade defining an opening therein and a cutting edge facing the opening; and
a scoring element supported by the frame near the blade and extending at least partly into the opening at an angle with respect to the cutting edge of the blade, the scoring element having a scoring edge projecting above the blade to cut into an item at the angle before being cut by the blade, wherein the scoring element is supported for movement substantially parallel to the cutting edge, along at least a portion of the blade.

2. The apparatus according to claim 1, further comprising an additional scoring element supported by the frame.

3. The apparatus according to claim 2, wherein the scoring element is arranged near one side of the blade, and the additional scoring element is arranged near an opposite side of the blade.

4. The apparatus according to claim 1, wherein the scoring element is supported between the blade and a handle.

5. The apparatus according to claim 1, wherein the blade is supported between the scoring element and a handle.

6. The apparatus according to claim 1, wherein the blade comprises a first portion defining a cutting surface, and a second portion adjacent the first portion defining a gap therebetween.

7. The apparatus according to claim 1, further comprising a scoring element adjustor operatively connected to the scoring element for moving the scoring element.

8. The apparatus according to claim 7, wherein the scoring element adjustor comprises a lever actuatable by a user to move the scoring element.

9. The apparatus according to claim 8, wherein the scoring element adjustor further comprises a shaft for translating a movement of the lever into a movement of the scoring element.

10. The apparatus according to claim 7, further comprising a spring operatively connected to the scoring element for returning the scoring element to an initial position.

11. The apparatus according to claim 1, wherein the scoring element is a rotatable cutting wheel.

12. The apparatus according to claim 1, wherein the scoring element is a protrusion.

13. The apparatus according to claim 1, further comprising a handle connected to the frame.

14. The apparatus according to claim 1, further comprising a knob connected to the frame.

15. The apparatus according to claim 1, wherein the frame comprises a handle portion.

16. An apparatus comprising:
a u-shaped frame having an open end;
a blade extending across the open end of the frame, the blade having a substantially rectangular body with an opening defined therein, the rectangular body comprising a first cutting side with a first cutting edge disposed thereon and a second cutting side with a second cutting edge disposed thereon, wherein the first and second cutting edges face each other and the opening; and
a rotatable cutting wheel supported by the frame within the open end of the frame, the rotatable cutting wheel having a scoring edge projecting above the blade to cut into an item before being cut by the blade;
wherein at least one of the first and second cutting sides have an opening at least partly into which the rotatable cutting wheel extends.

17. The apparatus according to claim 1, wherein the blade has one or more notches adjacent the scoring element to accommodate the scoring element such that the scoring element can extend at least partly into the one or more notches of the blade.

18. The apparatus according to claim 11, wherein the rotatable cutting wheel is supported on an axle at one side of the blade.

* * * * *